US005954032A

United States Patent [19]
Augustin et al.

[11] Patent Number: 5,954,032
[45] Date of Patent: Sep. 21, 1999

[54] CONTROL OF AN INJECTION SYSTEM FOR A MULTICYLINDER INTERNAL COMBUSTION ENGINE

[75] Inventors: Ulrich Augustin, Kernen; Gerhard Fraenkle, Remshalden; Claus-Juergen Schimmeyer, Vaihingen/Enz, all of Germany

[73] Assignee: DaimlerChrysler AG, Germany

[21] Appl. No.: 08/989,242

[22] Filed: Dec. 12, 1997

[30]  Foreign Application Priority Data

Dec. 12, 1996 [DE] Germany ................. 196 51 671

[51] Int. Cl.$^6$ ........................ F02M 41/00
[52] U.S. Cl. ..................... 123/456; 123/198 DB
[58] Field of Search ................. 123/446, 447, 123/458, 456, 198 D, 198 DB

[56] References Cited

U.S. PATENT DOCUMENTS

| | | | |
|---|---|---|---|
| 5,433,182 | 7/1995 | Augustin et al. | 123/198 DB |
| 5,492,099 | 2/1996 | Maddock | 123/446 |
| 5,511,528 | 4/1996 | Iwanaga et al. | 123/198 DB |
| 5,577,479 | 11/1996 | Popp | 123/456 |
| 5,692,476 | 12/1997 | Egler et al. | 123/456 |
| 5,727,516 | 3/1998 | Augustin et al. | 123/198 DB |
| 5,738,063 | 4/1998 | Pfuhl et al. | 123/456 |
| 5,816,220 | 10/1998 | Sttumpp et al. | 123/198 DB |

FOREIGN PATENT DOCUMENTS

| | | |
|---|---|---|
| 43 35 171 C1 | 5/1995 | Germany . |
| 44 14 242 A1 | 10/1995 | Germany . |
| 2 282 851 | 4/1995 | United Kingdom . |

*Primary Examiner*—Thomas N. Moulis
*Attorney, Agent, or Firm*—Evenson, McKeown, Edwards & Lenahan, P.L.L.C.

[57] ABSTRACT

A control for an injection system of a multicylinder internal combustion engine has a high pressure pump connected to a distributor element provided with outlet openings from which branch lines lead separately to groups of injection valves. The distributor element has first and second spring biased pistons that are operable to block selectively fuel to the branch lines, each of the pistons having a throttle point situated therein. When a major leak develops downstream from the distributor element, the branch line in which the leak has occurred is automatically shut off by the associated piston in the distributor element, due to the imbalance in pressure which results. When a minor leak develops, one of the branch lines is automatically closed by a control unit shutting off the injection valves associated with the other branch line, while the high pressure pump continues to deliver for at least one operating cycle. The other branch line and associate injection valves operate once again, with an adjustment of the fuel volume supplied when elimination of the leak is detected. When, however, it is determined that the leak still exists, injection valves that have been shut off are activated once again without delivering new fuel, and one branch line and associated injection valves continues to operate while adjusting the amount of fuel delivered.

7 Claims, 2 Drawing Sheets

CONTROL OF AN INJECTION SYSTEM FOR A MULTICYLINDER INTERNAL COMBUSTION ENGINE

BACKGROUND AND SUMMARY OF THE INVENTION

This application claims the priority of German patent document 196 51 671.4, the disclosure of which is expressly incorporated by reference herein.

The invention relates to a control of an injection system for a multicylinder internal combustion engine, especially for a Diesel engine.

A control and a fuel injection system of this generic type are described in German patent document DE 43 35 171 C1. This known fuel injection system makes it possible to detect leaks in the system and to close off a line that is leaking. The known system however is only effective for larger leaks.

The object of the present invention is to provide an improved fuel injection control arrangement, which has increased accuracy.

Another object of the invention is to provide a control which can detect even smaller leaks so that appropriate measures can be taken in such cases.

These and other objects and advantages are achieved by the fuel injection control according to the invention, which is premised on the proposition that the control electronics of an engine basically detects small leaks in the system, but it is not clear exactly where the leaks are located and how extensive they are. According to the invention, the line in which a major leak occurs is shut off by the piston which is upstream of the leaking line in its throttle position, due to the pressure drop behind the piston and the delivery of fuel in a throttled state. The piston, therefore, automatically blocks the associated branch line.

Smaller leaks that do not produce an immediate large pressure drop (to which the associated piston and its throttle point would react) are also detected by the control system according to the invention and their locations pinpointed. If the system detects even a small pressure drop in the system, the injection valves of a branch line are simply shut off or kept closed as a precaution while fuel continues to be delivered via the other branch line. If the system finally determines that there is no longer a leak, this means that the correct branch line was "accidentally" shut off. The branch line in which there is no leak can then continue in emergency operation, with a reduced volume of fuel being delivered.

If, however, the system determines that the leak is still present after the injection valves of a branch line are shut off, the shut-off injection valves are activated once again during a delivery pause of the high-pressure pump. As a result of the reduced pressure thus produced in the branch line, the associated sealing piston then automatically shuts off the leaking line. The other branch line can then continue emergency operation, with a reduced volume being injected.

The control according to the invention makes it possible to detect all kinds of leaks in this fashion, and can adopt appropriate countermeasures independently. In order to increase the sensitivity of the response, according to an embodiment of the invention, when smaller leaks develop, the check is initiated by fuel injection with an excess volume, with simultaneous reduction of the volume delivered.

Other objects, advantages and novel features of the present invention will become apparent from the following detailed description of the invention when considered in conjunction with the accompanying drawings.

DETAILED DESCRIPTION OF THE DRAWINGS

The fuel-injection system described below, to which the invention is applicable, is basically of a known type and operates in a known fashion; therefore, only the parts that are important to the invention will be described in greater detail.

Figure 1:
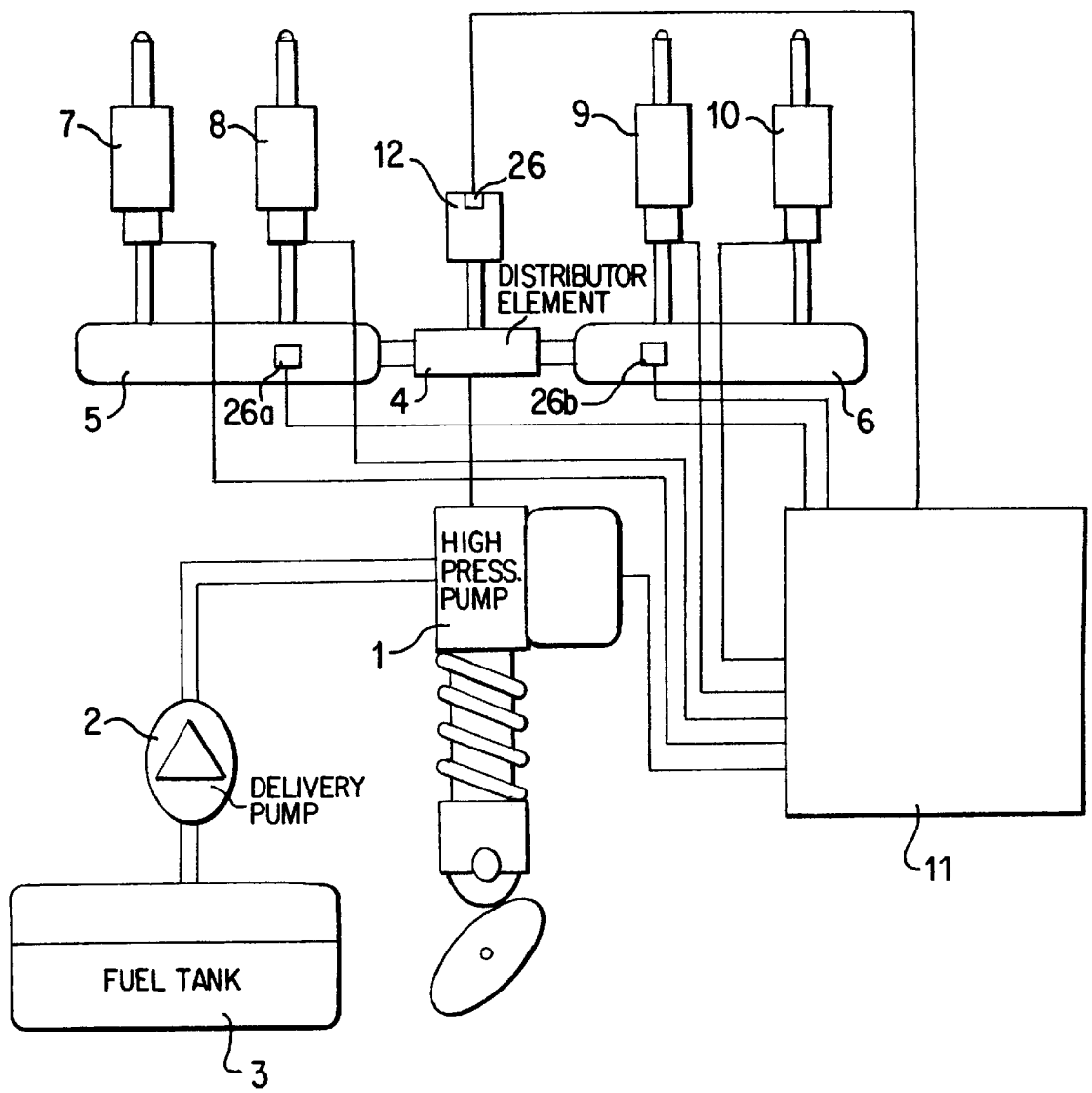
FIG. 1 is a general schematic view of the fuel injection system according to the invention.

Referring to FIG. 1, a high-pressure pump 1 is supplied through a predelivery pump 2 with fuel from a fuel tank 3. High-pressure pump 1 delivers the fuel through a fuel inlet opening into a distributor element 4 from where it is conducted further into two rail halves with branch lines 5 and 6. Branch line 5 is connected with injection valves 7 and 8 and branch line 6 is connected with injection valves 9 and 10.

Control electronics unit 11 controls high-pressure pump 1 and injection valves 7–10. On distributor element 4, there is a pressure sensor 12 that is electrically connected with control electronics unit 11. Additional pressure sensors 26a, 26b may also be provided in the system; for example, in branch lines 5 and 6, which are then likewise connected with control-electronics 11.

Figure 2:
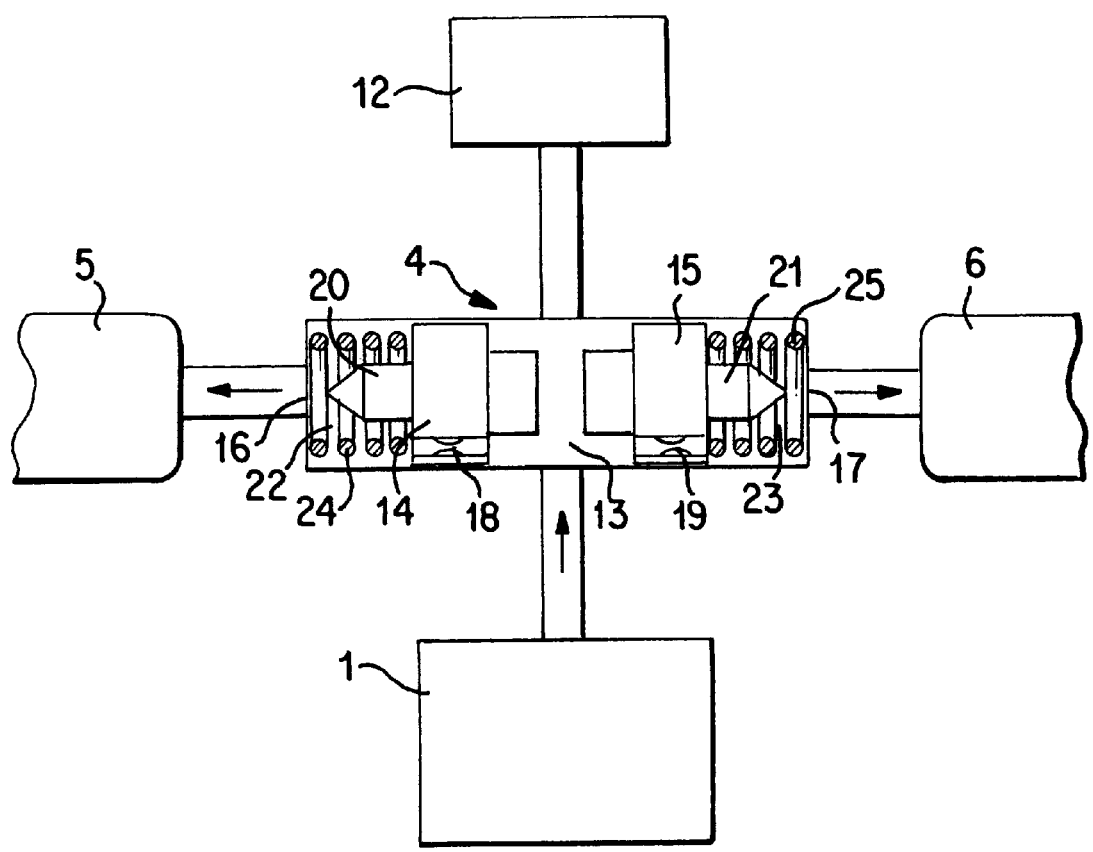
FIG. 2 is an enlarged view of the distributor element, including the piston according to the invention and the associated branch lines together with the high-pressure pump and pressure sensor.

The design and operation of the distributor element 4 are illustrated in greater detail in FIG. 2. High-pressure pump 1 feeds an input pressure chamber 13, which is also connected with an input pressure sensor 12. Two sealing pistons 14 and 15 are located opposite one another in distributor element 4. The arrangement of the two sealing pistons 14 and 15 however is designed so that they cooperate with matching expansions 20 and 21 in the form of valves with associated valve seats 16 and 17 respectively. Expansions 20 and 21 of sealing pistons 14 and 15 constitute blocking elements which cooperate with valve seats 16 and 17, said seats simultaneously also constituting outlet openings from distributor element 4 and being connected with branch lines 5 and 6, as a function of the positions of sealing pistons 14 and 15.

The two sealing pistons 14, 15 are provided with respective throttle bores 18, 19, which connect the input pressure chamber 13 to spring chambers 22, 23 located between sealing pistons 14 and 15 and valve seats 16 and 17. Spring chamber 22 contains a spring 24 urging piston 14 in the direction of input pressure chamber 13. A spring 25 in spring chamber 23 likewise urges piston 15 in the direction of input pressure chamber 13.

The fuel injection system according to the invention functions as follows:

During a delivery stroke of high-pressure pump 1, sealing pistons 14 and 15 with their expansions 20 and 21 move toward the corresponding valve seats 16 and 17, but do not reach them during the short delivery stroke. During the delivery pause of high-pressure pump 1, both rail halves or branch lines 5 and 6 draw the same amount of fuel from injection valves 6, 7 and 9, 10. As a result of the restoring forces of springs 24 and 25, the two sealing pistons 14 and 15 are pushed back into their starting positions. The throttle points in the two throttle bores 18 and 19 ensure that during delivery by high-pressure pump 1, there is insufficient time for fuel to be conducted through these throttle points. On the other hand, during the delivery pause of high-pressure pump 1, during which the two sealing pistons 14 and 15 return to their starting positions, the fuel is conducted out of input pressure chamber 13 through throttle bores 18 and 19 to top up spring chambers 22 and 23 and thus enter branch lines 5 and 6 as well.

Of course the throttle bores do not have to be designed together with the throttle points as simple bores; they can also be in the form of throttle grooves or leaks deliberately provided around the circumference of sealing pistons 14 and 15. It is merely essential that there be a throttle connection between input pressure chamber 13 and piston chambers 22 and 23.

When a malfunction occurs, caused by a large leak downstream from distributor element 4, in branch line 5 for example, the pressure drop causes sealing piston 14 to reach valve seat 16, closing the opening. This closure is also maintained during a delivery pause of high-pressure pump 1 because of the pressure differential at valve seat 16. In this fashion, the access to the site of the leak is of course closed and emergency driving operation is possible with the intact rail (i.e., branch line 6 in the example). In general, the electronics provided for this purpose use a pressure regulator, not shown, to reduce by half the amount of fuel delivered by high-pressure pump 1.

If the system determines that only a small pressure drop exists in the system because of a smaller leak, the following control becomes operational:

The two injection valves 7 and 8, supplied with fuel by branch line 5, are closed by a control signal. This means that full pressure remains in branch line 5. If high-pressure pump 1 then continues delivering normally, no significant amount of fuel can enter branch line 5 since injection valves 7 and 8 have not yet been, or are not being, activated. The two injection valves 9 and 10 supplied with fuel by branch line 6 have been or are being opened in the usual way, and are injecting fuel into the associated piston chambers. Because of the renewed activation of high-pressure pump 1 with the normal delivery volume, this volume can no longer be distributed uniformly to the two branch lines 5 and 6. That is, because of the previous failure of injection valves 7 and 8 to open, the fuel now flowing into input pressure chamber 13 can only flow into branch line 6. As a result of this increased flow, the sealing piston 15 automatically moves into its valve seat 17, adopting an "unbalanced position" and thus shutting off branch line 6. (That is, the failure of fuel to be injected into the corresponding piston chambers by injection valves 7 and 8 causes the rail half with branch line 6 to be shut off.) During the delivery pause, pressure sensors determine the pressure pattern or pressure behavior in the entire circuit. At this point, a distinction is made between two cases, namely when there is still a pressure drop and hence there is a leak, or no pressure drop can any longer be determined in the system.

If there is no pressure drop, this means that following the previous control operation, in which branch line 6 was shut off from the system when sealing piston 15 came to rest on valve seat 17, branch 6 was correctly shut off, by chance. That is, the leak must be on this rail side. In this case, previously shut-off injection valves 7 and 8 are allowed to function once again and high-pressure pump 1 delivers at a reduced volume in an emergency operating mode that is adjusted for the number of injection valves. The rail half with branch line 6 automatically remains closed.

On the other hand, if the system determines that the leak continues to exist after branch line 6 is shut off, this means that the leak must be in the rail half with branch line 5. That is, due to the leak fuel is drawn out of input pressure chamber 13 through throttle bore 18, even when injection valves 7 and 8 are not open. (Injection valves 9 and 10 on the other rail side with branch line 6 are temporarily stopped by the seating of sealing piston 15 on valve seat 17, and thus do not inject any fuel into the corresponding piston chambers.) At this time, injection valves 7 and 8 are opened again, so that the pressure in branch line 5 builds up once more. During this period of time, high-pressure pump 1 still does not deliver anything. If the pressure in input pressure chamber 13, therefore, drops below the pressure in branch line 6 (in which there is no leak and in which the full pressure still prevails because injection valves 9 and 10 have been stopped), sealing piston 15 moves into the open position once again, thus allowing access to branch line 6 once more. At this time, there is a pressure increase in input pressure chamber 13, so that because of the lack of a counterpressure in branch line 5, sealing piston 14 is pressed against its valve seat 16 and thus shuts off branch line 5. In this manner, the connection to high-pressure pump 1 is interrupted and this pump, with a correspondingly reduced delivery volume, can then supply injection valves 9 and 10, now normally activated once again, with fuel for emergency operation.

In order to increase the sensitivity of the system, the check to find smaller leaks can also be performed such that, after the injection valves are shut off on one side, not only the previous total injection volume, but even an excess volume, is injected. As a result of the control according to the invention, therefore, even smaller leaks that otherwise would not trigger a hydraulic shut-off mechanism are detected because of the control strategy and the closure of the "correct" rail half, in other words the one with the leak, being triggered.

It makes no difference which of injection valves 7 and 10 is closed after a minor leak is detected by the system control, for example injection valves 7 and 8 of branch line 5 in the embodiment. It is merely necessary to shut off or stop the injection valves of either rail half, whereupon the check and control described above necessarily take place so that in any event the correct rail side, namely the leaky side, is detected and then automatically cut off from the system.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Control for an injection system of a multicylinder internal combustion engine having at least one high-pressure pump to deliver fuel to injection valves, a fuel inlet opening connected with the high-pressure pump through a high-pressure line, a distributor element provided with outlet openings from which at least first and second branch lines lead separately to the injection valves, pressure sensors for sensing pressure at a plurality of points within the system, and a control unit which monitors pressure signals emitted by said sensors and controls said injection valves and said distributor element in response thereto, wherein:

said distributor element has first and second pistons that are operable to block selectively a flow of fuel to said first and second branch lines, each of said pistons having a throttle opening therein;

when a major leak develops in an area located downstream from the distributor element, the fuel supply from the distributor element to the branch line with the leak is automatically shut off;

when a minor leak develops, a selected one of said first and second branch lines is automatically closed by shutting off injection valves associated with the other branch line while the high-pressure pump continues to deliver for at least one operating cycle, the other branch line and associated injection valves being operated once again with an adjustment of the fuel volume supplied, when elimination of the leak is detected, and when it is determined that there is still a leak, injection valves that have been shut off are activated once again without delivering any new fuel, said selected one branch line and associated injection valves continuing to operate while adjusting the amount of fuel delivered.

2. Control according to claim 1 wherein when minor leaks appear, a check begins with fuel injection at an excess volume with a simultaneous reduction of delivery volume.

3. Control according to claim 1 wherein said selected one of said branch lines continues to operate in an emergency mode after a leak has been found, with fuel being supplied at a rate that is equal to approximately half of a previous rate.

4. Control according to claim 1 wherein said distributor element comprises:

respective sealing pistons which are located in the distributor element upstream of respective outlet openings for said branch lines, said sealing pistons having shut-off elements adapted to close said outlet openings;

an input pressure chamber connected with the high-pressure pump; and a respective spring chamber located upstream of each of the outlet openings, each of said spring chambers having therein a spring which urges one of the respective sealing pistons toward the input pressure chamber.

5. Control according to claim 4 wherein at least one pressure chamber is connected with an input pressure reservoir.

6. A control device for a fuel injection system of an internal combustion engine having a high pressure pump for delivering fuel to two fuel injector banks via branch lines associated therewith, comprising:

a distributor element through which fuel from said high pressure pump is provided to said branch lines;

a plurality of pressure sensors arranged at points within the fuel injection system; and a control unit coupled to receive output signals from said pressure sensors indicative of pressure-levels at points within the system, for controlling said fuel injector banks and said distributor element based on said output signals; wherein:

when a major leak occurs in an area downstream from said distributor element, said distributor element automatically shuts off a branch line in which such leak occurs; and when said control unit detects a relatively smaller leak in the fuel injector system it shuts off injectors in a first one of said fuel injector banks, whereby fuel flow to the other fuel injector bank is automatically curtailed by said distributor element, said other fuel injector bank continuing to operate with a curtailed fuel flow when said leak is determined by said control unit to have been eliminated, and when said leak has not been eliminated, said control unit reactivates said first fuel injector bank, without delivering any additional fuel flow, whereby one branch line and associated fuel injector bank continue to operate with a curtailed fuel flow.

7. A control device for a fuel injection system of an internal combustion engine having a high pressure pump for delivering fuel to two fuel injector banks via branch lines associated therewith, comprising:

a distributor element through which fuel from said high pressure pump is provided to said branch lines;

a plurality of pressure sensors arranged at points within the fuel injection system; and a control unit coupled to receive output signals from said pressure sensors indicative of pressure levels at points within the system, for controlling said fuel injector banks and said distributor element based on said output signals;

wherein said distributor element comprises an enclosure having first and second pistons situated therein which pistons separate said enclosure into a centrally located pressure chamber which is fluidically coupled to said high pressure pump, and laterally located spring chambers which are fluidically coupled with said branch lines, each of said pistons having a closure member which is engageable with one of said branch lines for closing off a flow of fuel thereto, and a throttle point which allows a limited flow of fuel from said pressure chamber to one of said spring chambers; and each of said spring chambers having a spring which biases one of said pistons in a direction toward the pressure chamber.

* * * * *